United States Patent
Damidaux et al.

(10) Patent No.: US 7,187,322 B1
(45) Date of Patent: Mar. 6, 2007

(54) RADIO NAVIGATION SYSTEM USING A CONSTELLATION OF POSITIONING SATELLITES WITH ALTERNATING TRANSMISSION AND ANALYSIS PHASES

(75) Inventors: Jéan-Louis Damidaux, Auzielle (FR); Didier Flament, Quint-Fonsegrives (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/402,019

(22) Filed: Apr. 12, 2006

(30) Foreign Application Priority Data

Apr. 14, 2005 (EP) ................... 05300284

(51) Int. Cl.
*H04B 7/185* (2006.01)
(52) U.S. Cl. .................. 342/357.02; 342/358
(58) Field of Classification Search .......... 342/357.01, 342/357.02, 357.06, 358; 701/226
See application file for complete search history.

(56) References Cited

U.S. PATENT DOCUMENTS 6,462,707 B1 10/2002 Clark et al.
2003/0040852 A1 2/2003 Green et al.

OTHER PUBLICATIONS

P.A.M. Abusali, Autonomous Navigation of Global Positioning System Satellites Using Cross-Link Measurements, Journal of Guidance, Control, and Dynamics, vol. 21 (2), p. 321, Mar.-Apr. 1998.*

* cited by examiner

*Primary Examiner*—Thomas H. Tarcza
*Assistant Examiner*—F H Mull
(74) *Attorney, Agent, or Firm*—Sughrue Mion, PLLC

(57) ABSTRACT

A positioning satellite for a constellation of satellites of a radio navigation satellite system includes transmitter adapted to transmit operational signals intended to enable the determination of positions of radio navigation receivers, receiver adapted to receive at least some of the operational signals transmitted by positioning satellites of the constellation that are in view and processor adapted to interrupt transmission of the operational signals by the transmitter at selected times for a selected duration and to analyze during each transmission interruption at least some of the operational signals received by the receiver during at least a portion of the selected duration, for example to verify the waveform thereof and/or to determine pseudodistances.

10 Claims, 2 Drawing Sheets

RADIO NAVIGATION SYSTEM USING A CONSTELLATION OF POSITIONING SATELLITES WITH ALTERNATING TRANSMISSION AND ANALYSIS PHASES

CROSS-REFERENCE TO RELATED APPLICATIONS

This application is based on French Patent Application No. 05300284.6 filed 14/04/2005, the disclosure of which is hereby incorporated by reference thereto in its entirety, and the priority of which is hereby claimed under 35 U.S.C. § 119.

BACKGROUND OF THE INVENTION

1. Field of the Invention

The invention relates to radio navigation satellite systems (RNSS) and global navigation satellite systems (GNSS), and more precisely to improving the navigation performance offered by those systems.

2. Description of the Prior Art

In radio navigation systems such as GALILEO or GPS, determining the orbits of the satellites of the constellation of positioning satellites and clock synchronization are based on processing measurements effected by terrestrial control stations. Because of the terrestrial location of these stations relative to the satellites of the constellation (which are in medium Earth orbit), it is difficult to position the satellites very accurately. Moreover, the terrestrial location of these stations rules out the detection of certain operational signal anomalies, reflected in waveform distortion ("evil waveform"), for example. The operational signals are transmitted by the positioning satellites and are intended to enable the positions of GNSS or RNSS receivers, for example GPS receivers, to be determined. Consequently, any operational signal transmission anomaly is liable to limit the navigation performance of radio navigation satellite systems.

In an attempt to improve the navigation performance of the next generations of GPS radio navigation systems, in particular the future "GPS III" version, it has been proposed to install on the positioning satellites thereof a so-called intersatellite ranging (ISR) transceiver dedicated to determining the pseudodistances between the satellites. However, those transceivers use dedicated signals that are totally different from the operational signals and therefore require specific time synchronization and calibration. This introduces additional complexity at the positioning satellite level and increases satellite fabrication costs. Furthermore, these transceivers are not able to determine operational signal transmission anomalies, as they process only dedicated signals.

Thus one particular object of the invention is to solve some or all of the problems cited above and more particularly to improve the navigation performance of radio navigation satellite systems.

SUMMARY OF THE INVENTION

To this end the invention proposes a positioning satellite for a constellation of satellites of a radio navigation satellite system including transmitter means adapted to transmit operational signals intended to enable the determination of positions of radio navigation receivers, receiver means adapted to receive at least some of the operational signals transmitted by positioning satellites of the constellation that are in view (from the satellite) and processor means adapted to interrupt transmission of the operational signals by the transmitter means at selected times for a selected duration and to analyze during each transmission interruption at least some of the operational signals received by the receiver means during at least a portion of the selected duration.

The positioning satellite of the invention may have other features, and in particular, separately or in combination:

Its processor means may be adapted to interrupt transmission periodically to establish an alternation of transmission phases and analysis phases;

the alternation is preferably offset in time from one positioning satellite of the constellation to another so that in each period each positioning satellite of the constellation has an analysis phase during which it is the only one to interrupt its transmission of operational signals;

its processor means may be adapted to analyze the waveform of the received operational signals in order to detect signal distortion representing transmission anomalies and constituting analysis results;

its processor means may be adapted to analyze the received operational signals in order to determine pseudodistances between their satellite and the satellites in view from which the operational signals come, the pseudodistances constituting analysis results;

it may include calculator means adapted to determine the position of their satellite from the pseudodistances determined by the processor means and complementary radio navigation data, each position determined constituting an analysis result;

its processor means may be adapted to instruct said transmitter means to transmit at least some of said analysis results to at least one terrestrial station of said radio navigation satellite system and/or to radio navigation receivers;

its receiver means may be adapted to receive complementary operating data from at least one terrestrial station of the radio navigation satellite system and intended for other positioning satellites of the constellation; in this case, the processor means are adapted to instruct the transmitter means to transmit the complementary operating data received by the receiver means to the positioning satellites that are the destinations thereof.

The invention also proposes a radio navigation satellite system equipped with a constellation of positioning satellites of the type described hereinabove.

The invention is particularly well adapted, although not exclusively so, to GALILEO and GPS radio navigation satellite systems.

Other features and advantages of the invention will become apparent after reading the following detailed description and examining the appended drawings.

DETAILED DESCRIPTION OF THE PREFERRED EMBODIMENT

The appended drawings constitute part of the description of the invention as well as contributing to the definition of the invention, if necessary.

An object of the invention is to improve the navigation performance of a radio navigation satellite system.

The radio navigation satellite system considered hereinafter by way of nonlimiting example is the GALILEO system. The invention is not limited to that type of radio navigation satellite system, however. It relates to other types of radio navigation satellite system, for example the GPS.

Figure 1:
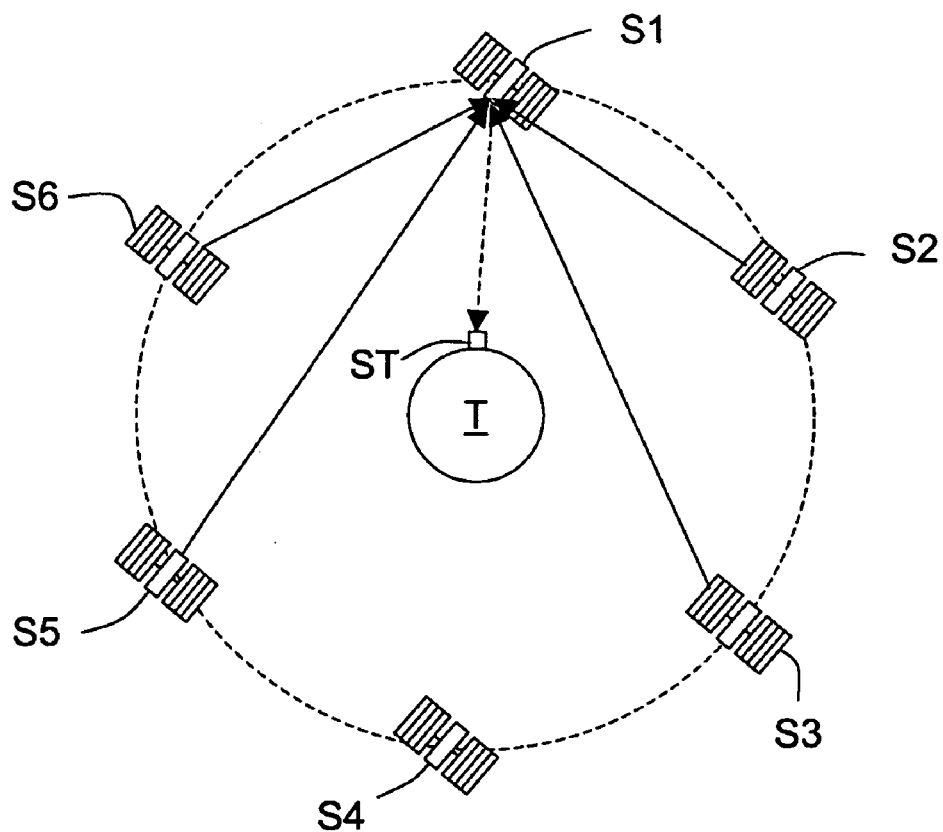
FIG. 1 is a diagram of a portion of a radio navigation satellite system of the invention.

A radio navigation satellite system is described first with reference to FIG. 1.

Broadly speaking, a radio navigation satellite system comprises a constellation CS of positioning satellites Si and control stations ST at selected locations on the Earth T.

For example, the constellation of the future GALILEO system includes around 30 positioning satellites Si (i=1 to 30) in medium Earth orbit, their orbits around the Earth T being approximately contained in (for example) three planes. In order not to overcomplicate FIG. 1, only six satellites S1 to S6 are represented in the same plane.

The control stations ST (also known as "uplink stations") transmit navigation and synchronization information intended to be used to synchronize their internal clocks to the positioning satellites Si by radio.

Figure 2:
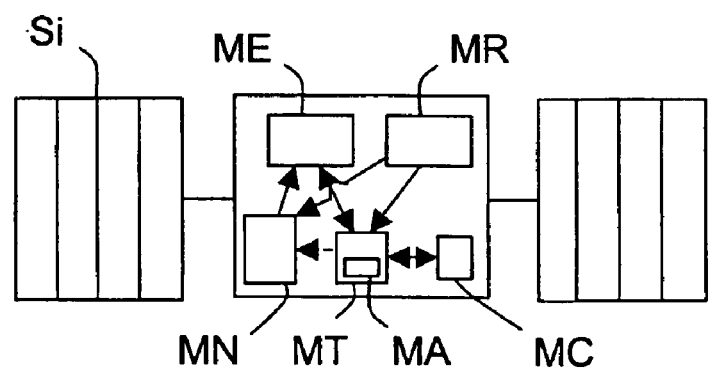
FIG. 2 is a functional block diagram of one embodiment of a positioning satellite of the invention for use in a radio navigation satellite system of the type shown in FIG. 1.

As shown in FIG. 2, each positioning satellite Si includes a navigator module MN for generating messages to be transmitted by radio by a transmitter module ME, in particular towards the Earth T, in order that they may be used by radio navigation receivers situated on the Earth T or in its vicinity. Moreover, each positioning satellite Si includes a receiver module MR for receiving information transmitted by the control stations ST in order to communicate that information to the navigator module MN.

Each message transmitted by a (positioning) satellite Si is made up of so-called "operational" signals that contain, among other things, data representing the identifier of said satellite Si and its sending time relative to its internal clock.

When a radio navigation receiver receives a message, it determines the identifier of the satellite Si that sent it and then the time taken by that message to reach it, given its time of reception and the orbit of the identified satellite Si (stored in an identifier/orbit table), and finally the pseudodistance between it and the satellite Si, given the time of sending the message. When the radio navigation receiver knows the four pseudodistances between it and four different satellites that are "in view", it is in a position to determine its space-time position (X, Y, Z, t).

Distortion of the operational signals, caused by electromagnetic interference, for example, is liable to limit the accuracy of the space-time position measurement.

The invention proposes installing in each satellite Si of a constellation CS of a radio navigation system a processor module MT in addition to its transmitter module ME, receiver module MR and navigator module MN.

According to the invention, the receiver module MR of a satellite Si is made responsible for receiving at least some of the operational signals that are transmitted by the positioning satellites Si' of the constellation CS that are in view, which signals have until now been intended for the radio navigation receivers.

In a GALILEO type system, the operational signals are transmitted by the transmitter module ME of the satellite Si in the "E1" frequency band centered on a frequency of approximately 1575.420 MHz and/or the "E5" frequency band centered on a frequency of approximately 1191.795 MHz.

It is important to note that the receiver module MR, which is used to receive the operational signals, may be different from that conventionally used to receive information coming from the control stations ST. It may in fact be a dedicated receiver module.

According to the invention, the processor module MT is made responsible, firstly, for interrupting transmission of the operational signals by the transmitter module ME at selected times and over a selected duration, and, secondly, for analyzing during each transmission interruption at least some of the operational signals that have been received by the receiver module MR during at least a portion of that selected duration.

The processor module MT is able to instruct interruption of the transmission of operational signals either at the level of the navigator module MN or at the level of the transmitter module ME.

This interruption is preferably effected periodically. This enables the definition for each satellite Si of cycles of period P during each of which there occur alternately a transmission phase of selected duration DT and an analysis phase of selected duration DA.

The cycles of the satellites Si (or at least those in orbit in substantially the same plane), and therefore their phase alternations, are preferably offset in time from each other. This enables each satellite Si to receive once in each period P the operational signals transmitted by each of the other satellites Si' in the same plane as itself. In other words, during each period P each satellite Si has an analysis phase DA during which it is the only one to interrupt its transmission of operational signals.

Figure 3:
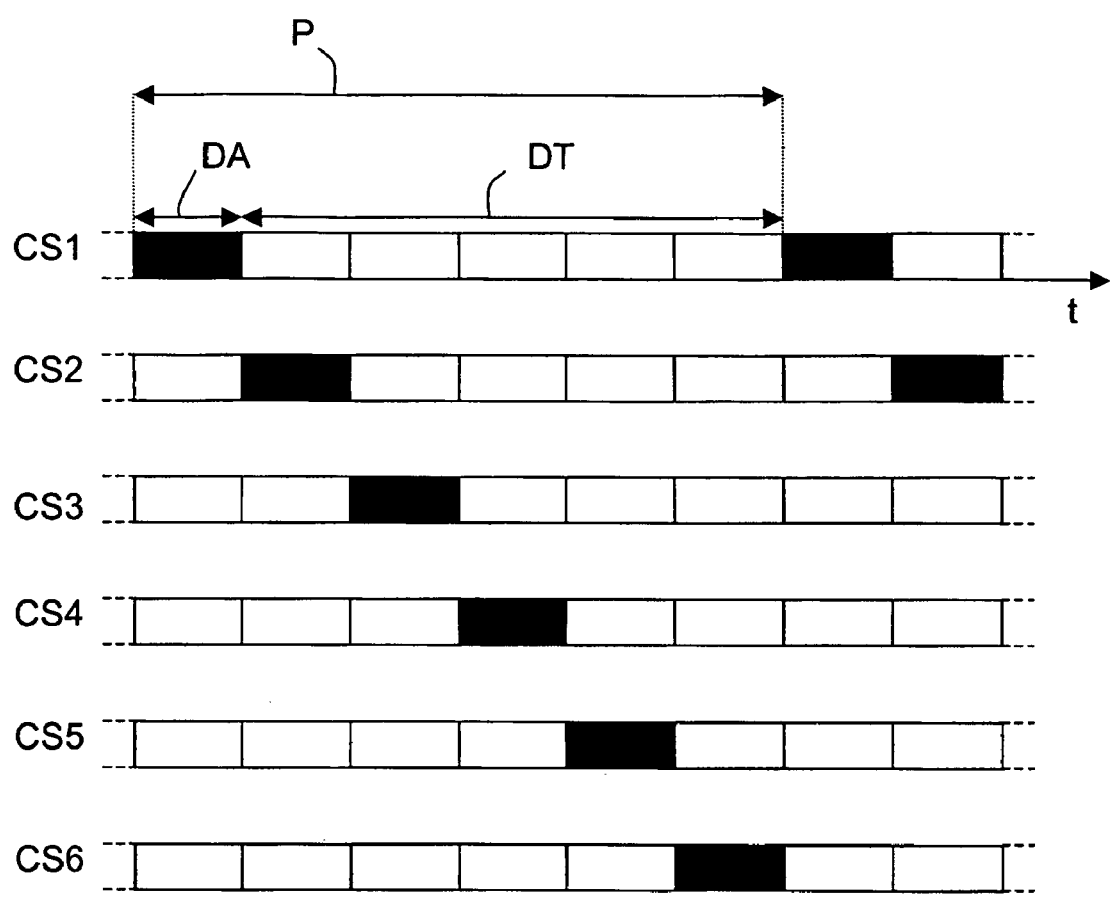
FIG. 3 is a diagram of cycles of alternating transmission and analysis phases for the six positioning satellites shown in FIG. 1.

FIG. 3 shows an example of cycles CS1 to CS6 of alternating transmission phases of duration DT and analysis phases of duration DA for the six positioning satellites S1 to S6 situated in approximately the same plane in FIG. 1. Of course, this is merely an illustrative example and is open to many variants.

The analysis may relate to all the operational signals received during the analysis phase DA, to only the operational signals received during a selected portion of the analysis phase DA or to only some of the latter signals.

The processor module MT may be configured to effect one or more analyses.

For example, the analyzer module MA may be made responsible for analyzing the operational signals received in order to determine the pseudodistances between its satellite Si and the satellites Si' in view that transmitted said operational signals. To this end, the analyzer module MA has only to subtract the time of receiving each operational signal from its time of sending (which is defined by data that it contains) and then to multiply the result of this subtraction by the speed of light.

Instead of or in addition to this, the processor module MT may include an analyzer module MA responsible for analyzing the waveform of the operational signals received in order to detect signal distortion representing transmission anomalies. Waveform distortion ("evil waveform") may be detected, for example. Any technique may be envisaged for providing this detection function. For example, techniques may be implemented in the module MA for processing the received signal based on correlation of the code of the received signal with a replica of that code contained in software of the module MA. Metrics are generated on the basis of these correlations (or comparisons) and compared to predefined thresholds. Templates or fast Fourier transforms (FFT) may equally be used.

A calculator module MC may also be provided in each satellite Si for determining its position from pseudodistances determined by the analyzer module MA and complementary radio navigation data (of the type constituting the satellite identifier/orbit correspondence table stored in the radio navigation receivers). The calculator module MC and at least a portion of the analyzer module MA dedicated to determining the pseudodistances then together constitute, as it were, a subsystem equivalent to that dedicated to the acquisition of space-time positions in a radio navigation receiver.

This is particularly advantageous as it enables each satellite to be converted into an autonomous navigator that knows at virtually all times its space-time position in a selected frame of reference.

In contrast to what is shown in FIG. 2, the calculator module MC may be integrated into the processor module MT.

In addition to analyzing operational signals coming from the satellites Si' in view, the processor module MT of each satellite Si may also be made responsible for instructing the transmitter means to transmit at least some of the analysis results to the Earth T and therefore to at least one control station ST of the radio navigation system and/or to radio navigation receivers.

This is particularly advantageous because it greatly simplifies the task of the radio navigation receivers (if the analysis result relates to the pseudodistances of the satellite Si relative to the other satellites Si' in view, or better still the space-time position of the satellite Si), and therefore improves navigation performance and in particular the accuracy of the determination of the space-time positions of the radio navigation receivers.

The processor module MT of each satellite Si can be configured to instruct the transmitter module ME to transmit at least some of the analysis results during or after the analysis phase DA.

The receiver module MR of each satellite Si may also be adapted to receive additional operating data from at least one control station ST of the radio navigation system intended for other satellites Si' of the constellation CS.

That additional operating data may consist of navigation and synchronization information for synchronizing the internal clocks or updating the satellite identifier/orbit tables, for example, or any other information useful for internal analyses.

In this case, the processor module MT of each satellite Si is advantageously made responsible for instructing the transmitter module ME to transmit the additional operating data (received by the receiver module MR) to the satellites Si' in view that are its destination.

This is particularly advantageous as it confers upon each satellite Si of a constellation CS a function of relaying information to the other satellites Si' that are not in a position to receive said information during certain phases of their orbits.

The processor module MT and where appropriate the calculator module MC of the positioning satellite of the invention can take the form of electronic circuits, software (or electronic data processing) modules, or a combination of circuits and software.

Given that a positioning satellite Si is not able to transmit the standard operational signals during its analysis phase, it may be advantageous to provide at least one complementary positioning satellite in the constellation CS. For example, if the satellites of the constellation are distributed in approximately three planes, a complementary satellite may be provided in each plane. The backup satellite provided in some constellations that is substituted for a failed satellite may also be used.

The invention offers a number of advantages, according to the functions of the variants envisaged, including, separately or in combination:

improving the determination of the real orbits of the positioning satellites and intersatellite synchronization, in particular enabling typical accuracies in respect of the space-time positions of less than about 70 cm and a combined error on the accuracy of the orbits and the clocks of the order of 1 a (sigma) to be achieved, the possibility of converting each positioning satellite into an autonomous navigator, and the possibility of detecting and isolating transmission anomalies.

The invention is not limited to the positioning satellite and radio navigation satellite system embodiments described hereinabove by way of example only, and encompasses all variants that the person skilled in the art might envisage that fall within the scope of the following claims.

The invention claimed is:

1. A positioning satellite for a constellation of satellites of a radio navigation satellite system, each satellite of said constellation including;

transmitter means adapted to transmit operational signals intended to enable the determination of positions of radio navigation receivers, receiver means adapted to receive at least some of said operational signals transmitted by positioning satellites of said constellation that are in view and processor means adapted to interrupt transmission of said operational signals by said transmitter means at selected times for a selected duration and to analyze during each transmission interruption at least some of the operational signals received by said receiver means during at least a portion of said selected duration.

2. A positioning satellite according to claim 1, wherein said processor means are adapted to interrupt transmission periodically to establish an alternation of transmission phases and analysis phases.

3. A positioning satellite according to claim 2, wherein said alternation is offset in time from one positioning satellite of said constellation to another so that in each period each positioning satellite of said constellation has an analysis phase during which it is the only one to interrupt its transmission of operational signals.

4. A positioning satellite according to claim 1, wherein said processor means are adapted to analyze the waveform of said received operational signals in order to detect signal distortion representing transmission anomalies and constituting analysis results.

5. A positioning satellite according to claim 1, wherein said processor means are adapted to analyze said received operational signals in order to determine pseudodistances between their satellite and the satellites in view from which said operational signals come, said pseudodistances constituting analysis results.

6. A positioning satellite according to claim 5, including calculator means adapted to determine the position of their satellite from said pseudodistances determined by said processor means and complementary radio navigation data, each position determined constituting an analysis result.

7. A positioning satellite according to claim 4, wherein said processor means are adapted to instruct said transmitter means to transmit at least some of said analysis results to at least one terrestrial station of said radio navigation satellite system and/or to radio navigation receivers.

8. A positioning satellite according to claim 7, characterized in that said processor means are adapted to instruct said transmitter means to transmit said analysis results during an analysis phase.

9. A positioning satellite according to claim 1, wherein said receiver means are adapted to receive complementary operating data from at least one terrestrial station of said radio navigation satellite system and intended for other positioning satellites of said constellation and said processor means are adapted to instruct said transmitter means to transmit said complementary operating data received by said receiver means to the positioning satellites that are the destinations thereof.

10. A radio navigation system including a constellation of positioning satellites according to claim 1.

* * * * *